(12) United States Patent
Nobili

(10) Patent No.: US 9,297,475 B2
(45) Date of Patent: Mar. 29, 2016

(54) SYSTEM FOR ADJUSTING WATER IN A SHOWER, BATHROOM, OR KITCHEN SINK

(71) Applicant: Fabrizio Nobili, San Vittore (CH)

(72) Inventor: Fabrizio Nobili, San Vittore (CH)

( * ) Notice: Subject to any disclaimer, the term of this patent is extended or adjusted under 35 U.S.C. 154(b) by 175 days.

(21) Appl. No.: 14/242,668

(22) Filed: Apr. 1, 2014

(65) Prior Publication Data
US 2015/0115183 A1    Apr. 30, 2015

(30) Foreign Application Priority Data

Oct. 25, 2013  (EP) .................................... 13190336
Nov. 7, 2013  (EP) .................................... 13191870
Feb. 17, 2014  (EP) .................................... 14155396

(51) Int. Cl.
*F16K 21/06*   (2006.01)
*F16K 31/08*   (2006.01)
*F16K 31/385*  (2006.01)

(52) U.S. Cl.
CPC ................ *F16K 31/08* (2013.01); *F16K 21/06* (2013.01); *F16K 31/086* (2013.01); *F16K 31/3855* (2013.01)

(58) Field of Classification Search
CPC ..... F16K 31/08; F16K 21/06; F16K 31/3855; F16K 31/086
USPC ...................................... 251/25, 65, 229–230
See application file for complete search history.

(56) References Cited

U.S. PATENT DOCUMENTS

| | | | | |
|---|---|---|---|---|
| 2,629,401 A | * | 2/1953 | Miller | F16K 31/086 251/38 |
| 5,169,117 A | * | 12/1992 | Huang | F16K 31/404 251/38 |
| 5,758,863 A | * | 6/1998 | Buffet | F16K 31/3855 251/28 |
| 6,607,174 B2 | * | 8/2003 | Weber | F16K 31/404 251/25 |
| 7,296,593 B2 | * | 11/2007 | Matsui | E03C 1/04 251/230 |

FOREIGN PATENT DOCUMENTS

| | | |
|---|---|---|
| DE | 3109943 | 10/1982 |
| DE | 4341620 | 6/1995 |
| DE | 4341650 | 6/1995 |
| EP | 0183102 | 6/1986 |
| EP | 0831260 | 3/1998 |

(Continued)

OTHER PUBLICATIONS

European Search Report from European Application 13191870 dated Apr. 28, 2014.

(Continued)

*Primary Examiner* — John Bastianelli
(74) *Attorney, Agent, or Firm* — Dorsey & Whitney LLP

(57) ABSTRACT

A system for adjusting water in a domestic water diffuser, in particular for opening and closing water in a shower or bathroom or kitchen sink and for adjusting the flow rate, is described. The system comprises a shutter with at least one metal part slidable inside a cylindrical chamber with a diameter substantially equal to the diameter of the shutter; the system also comprises a pushbutton comprising a magnet; the pushbutton is configured to be operated by means of a finger to mechanically displace the shutter by means of the magnet along an axis of the cylindrical chamber, into two different positions, corresponding to opening of the flow or closing of the flow of water from a diffuser, the pushbutton being also rotatable about the axis, to vary the open position of the shutter along the axis and a corresponding flowrate.

14 Claims, 11 Drawing Sheets

SECTION A-A    iNTERMEDiATE

(56) References Cited

FOREIGN PATENT DOCUMENTS

| | | |
|---|---|---|
| GB | 2103391 | 2/1983 |
| JP | 2001098596 | 4/2001 |
| WO | WO 2014/076242 | 5/2014 |

OTHER PUBLICATIONS

European Search Report from European Application 14155396 dated Apr. 28, 2014.

* cited by examiner

SECTION A-A

OPENED

SECTION A-A        INTERMEDIATE

SECTION B-B

SECTION A-A

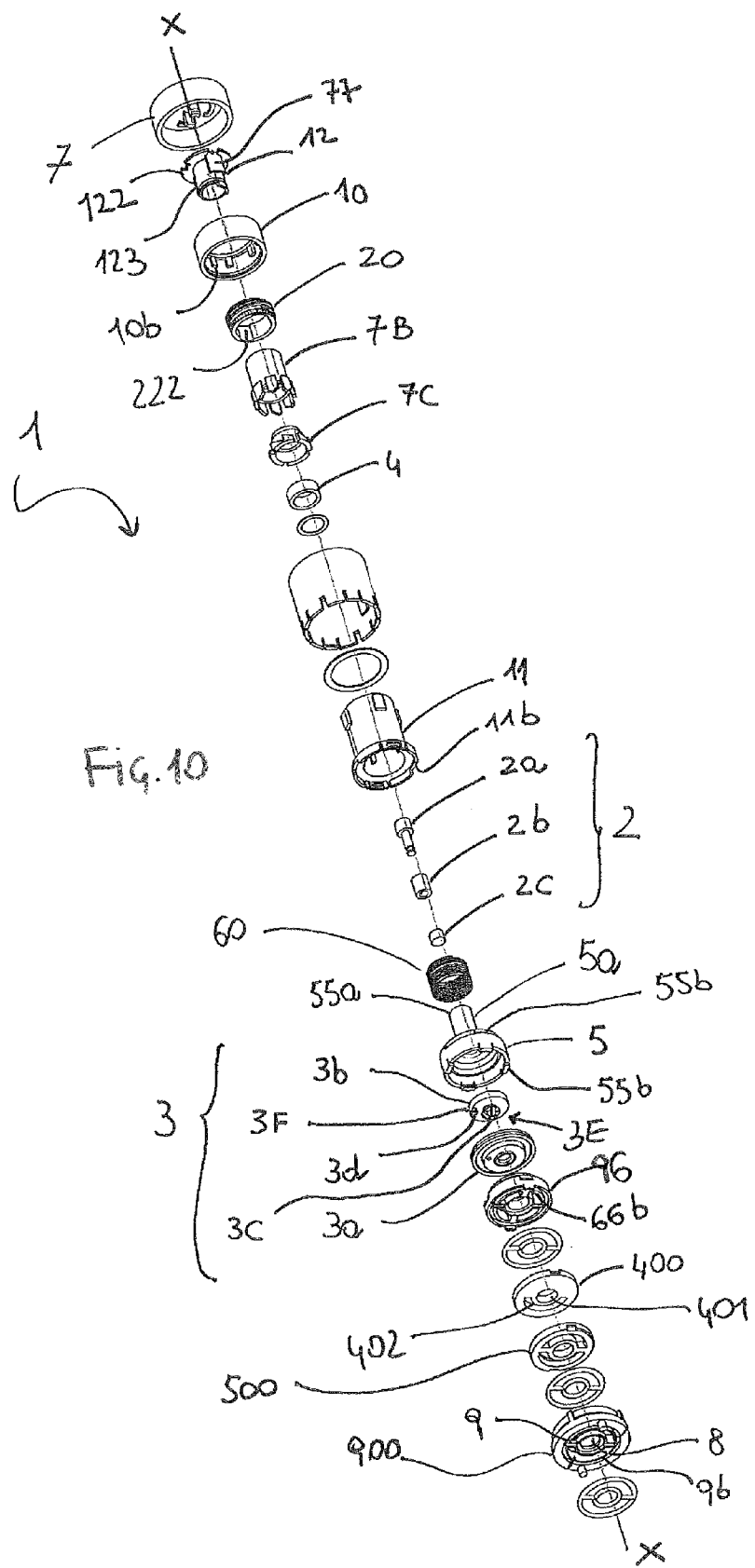

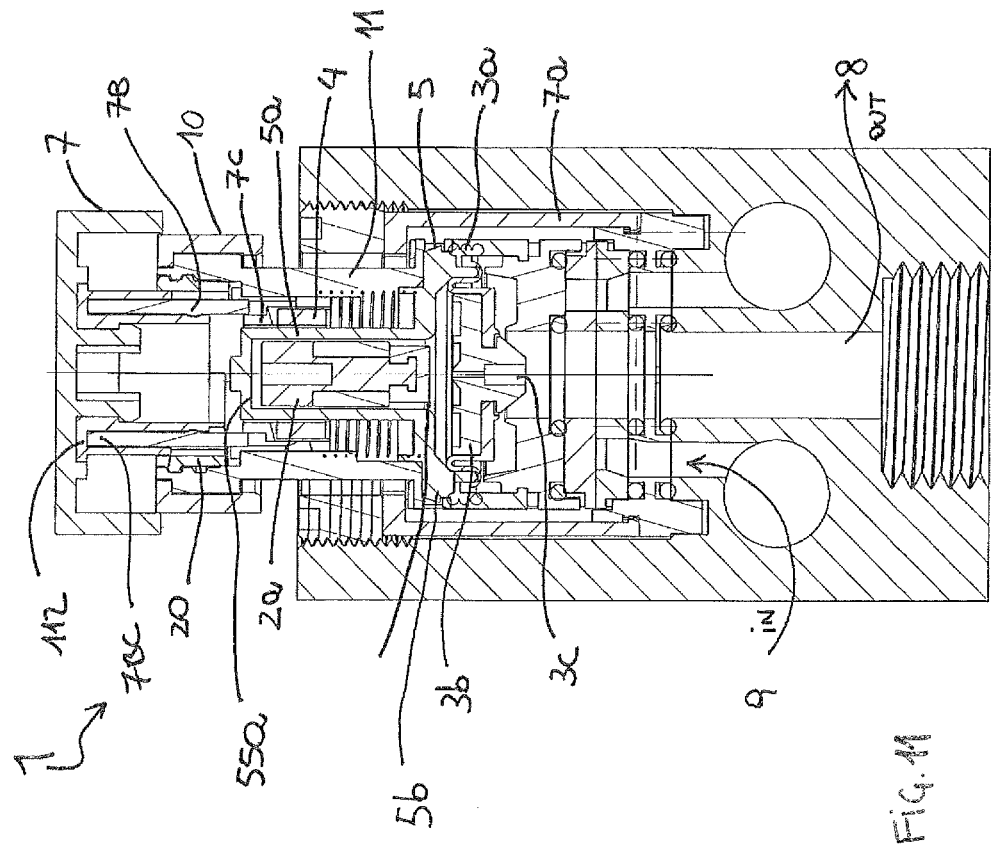
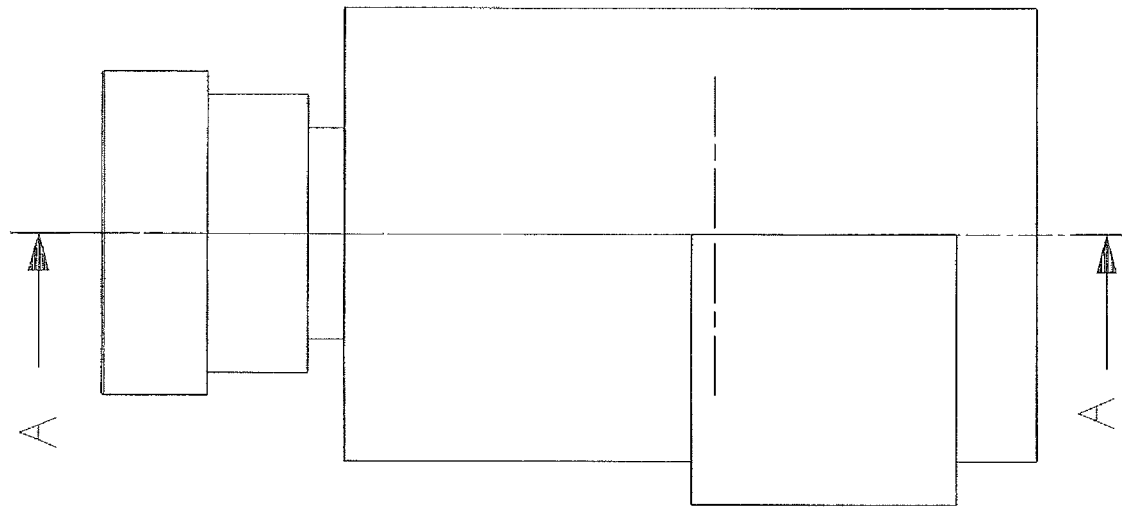
Fig. 14

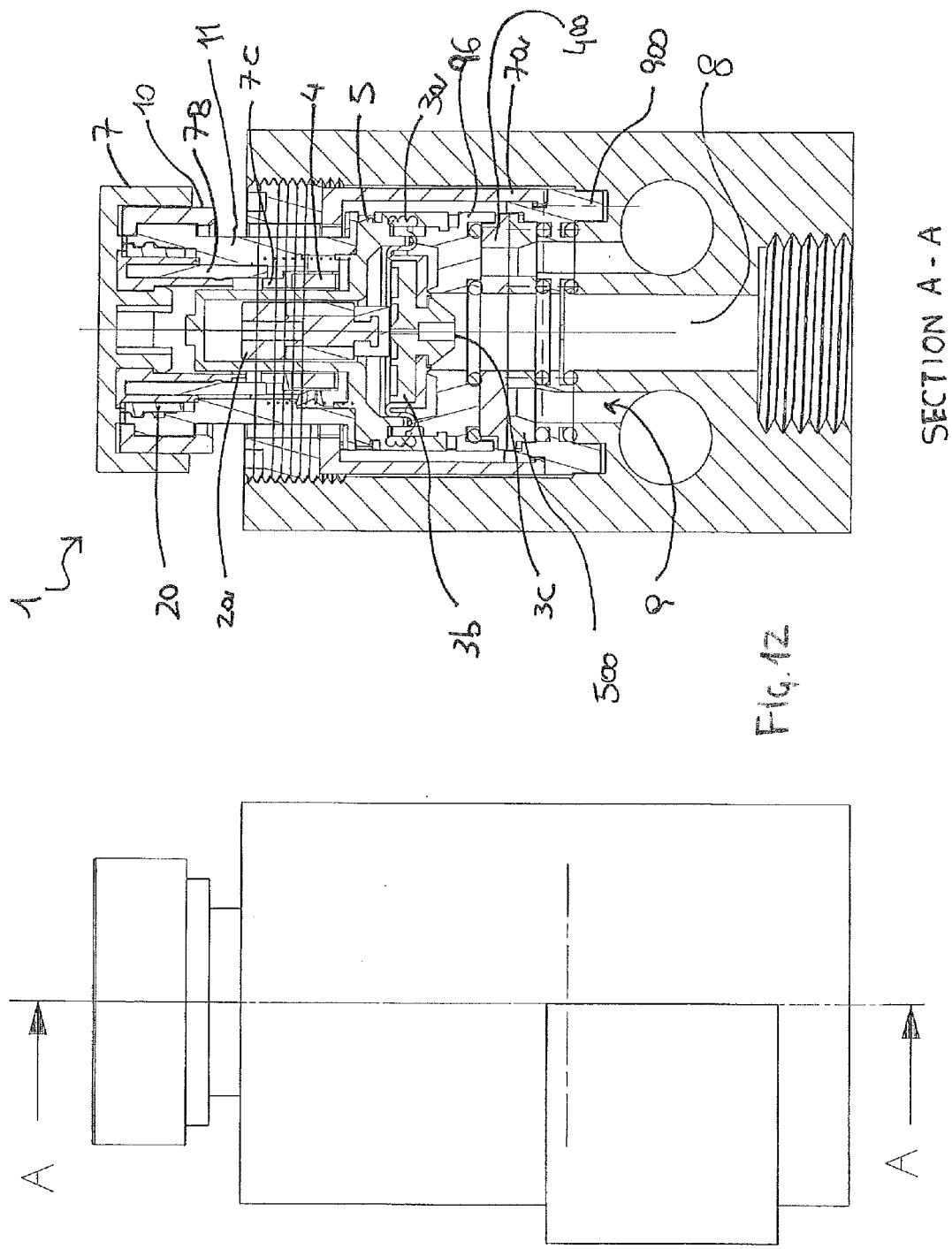

SYSTEM FOR ADJUSTING WATER IN A SHOWER, BATHROOM, OR KITCHEN SINK

CROSS-REFERENCE TO RELATED APPLICATIONS

This application claims priority to European Patent Application No. 13190336.1 filed on 25 Oct. 2013, European Patent Application No. 13191870.8 filed on 7 Nov. 2013, and European Patent Application No. 14155396.6 filed on 17 Feb. 2014, the entire contents of each of the foregoing applications are incorporated herein by this reference.

FIELD OF APPLICATION

Embodiments of the present invention relate to a system for adjusting water in a shower, bathroom, or kitchen sink. In particular, embodiments of the invention relate to a system that can be operated manually by, for example, means of a finger.

BACKGROUND

Systems for adjusting the water in a shower or domestic sink, which are for example mounted on a shower panel or a worktop of the kitchen sink, are known.

Some systems which are particularly appreciated for elegance and ease of use are those which are electronically controlled by means of a control unit mounted on the shower panel or underneath the worktop, to operate a solenoid valve for shutting off the water flow from the supply pipes, in a known manner.

In some cases, these systems are equipped with a digital pushbutton, directly mounted on the shower panel or on the worktop and electrically connected to the control unit, for opening and closing of the water. The digital pushbutton may be operated by means of the pressure of a finger.

These electronic systems are somewhat costly and bulky. Moreover, they require the installation of the control unit and electrical wiring thereof to a power point, which is not always available.

Manual systems for adjusting water are also known. A known manual system is equipped with a ceramic screw rotatable on a rotating shaft, for intercepting the water.

In this case also, the shaft may be engaged and rotated by means of a pushbutton on the shower panel or on the sink and able to be operated by means of the pressure of a finger, to open or close the flow.

However, differently from the electronic systems, in order to rotate manually the ceramic screw it is necessary to apply a fairly heavy pressure on the pushbutton, especially if the water pressure from the supply pipes is high.

It is also known to combine the screw shaft with one or more reduction gears in order to reduce the pressure exerted on the pushbutton by the finger. However, this technical solution has as a consequence an inevitable greater complexity of the system and an increase in its size.

SUMMARY

The technical problem at the base of one or more embodiments of the present invention is that of providing a system for adjusting the water in a shower or in a bathroom or kitchen sink, which can be easily made and mounted on the shower or sink and which is particularly sensitive to manual operation, thus overcoming the drawbacks hitherto associated with the known systems.

The solution of one or more embodiments of the present invention is to provide a system in which opening or closing and adjusting of the water is obtained by the manual displacement of a magnet associated with a metal core which acts as a shutter on a disk for closing or opening the flow.

Essentially, the magnet is incorporated in a pushbutton which may be displaced manually into two different positions along an axis X, for instance with a light pressure of a finger. The pushbutton is also rotatable about the axis X, to vary the open position of the shutter along the axis X and adjust a corresponding flow rate.

The metal core is movable inside a cylindrical chamber along which the magnet is also slidable. The pressure exerted manually on the pushbutton has the function of only moving by a few millimeters the magnet and consequently the shutter associated with it. This small movement, for example of 2 or 3 millimeters, merely has the function of bringing the shutter into contact with the disk or moving the shutter away from the disk.

Closure of the disk, and in particular closure of a small hole in the disk, results in a rapid displacement of the disk so as to close the flow, due to filling of a chamber inside which the disk is movable. The chamber is filled with pressurised water from the supply network and displaces the disk into a closed position, substantially compressing it against the outlet.

Vice versa, separation of the shutter from the disk results in a rapid movement of the disk away from its closed position, as a result of emptying of the chamber and the pressure of the incoming water.

In other words, during closing, the water inside the chamber exerts a pressure on the disk, compressing it against an outlet of the fluid. On the other hand, during opening, the absence or reduction of water inside the chamber, and therefore the absence or the reduction of the pressure exerted on the disk towards the outlet, allows the outlet to be freed.

Advantageously, according to one or more embodiments of the present invention, closing of the flow is performed by means of the disk which is operationally associated with the shutter and the shutter merely has the function of triggering the movement of the disk inside the chamber, as a result of the water which enters or leaves the chamber.

When the shutter closes the hole in the disk, the disk moves into the position for closing the flow. When instead the shutter frees the water outlet hole in the disk, the disk moves into the position for opening the flow.

During realization of one or more embodiments of the present invention the Applicant has understood how to adapt a solenoid valve for more advantageous manual operation in connection with the closing systems for showers and domestic sinks. In a solenoid valve, a suitably powered electrical winding generates an electromagnet field able to displace a metal core, for opening the solenoid valve; when there is no electric field, a compression spring pushes the metal core, in order to close the flow.

According to one or more embodiments of the present invention, however, it is not required to use any electrical winding or electric power supply; the magnet always exerts a force of attraction on the metal core (shutter) both in order to close the flow and in order to open it. The position of the shutter is always associated with the position of the magnet, via a cylindrical chamber inside which the shutter is slidable and from which it communicates with the fluid shut-off disk.

According to the proposed solution mentioned above, the technical problem is solved by a system for adjusting water in a shower or in a bathroom or kitchen sink, comprising a shutter having at least one metal part, a pushbutton comprising a magnet associated with the metal part of the shutter, the pushbutton being able to be operated manually along an axis X so as to displace the magnet and the associated shutter to open the water flow from the diffuser or close the flow, wherein the pushbutton is also rotatable about the axis X, to vary the open position of the shutter 2 along the axis X and vary a corresponding flow rate.

According to one aspect of the invention, the pushbutton is configured to return into the same position, before and after closing or opening of the water flow.

According to another aspect, the shutter is slidable inside a cylindrical chamber with a diameter which is substantially the same as a diameter of the shutter, around which the magnet is also slidable.

The system comprises an outlet for delivery of the water from the diffuser and a disk movable between a position for closing the outlet and a position for opening the outlet, said disk closing or opening position being manually controlled by means of the pushbutton.

In particular, the displacement of the magnet and the shutter has the function of causing the disk to move into the open or closed position; even more particularly, the movement from the closed position into the open position or vice versa is triggered by the shutter, respectively, when the shutter is separated from or engaged with the disk, i.e. in order to open or close the hole. In order to keep the disk in the closed or open position, the shutter remains, respectively, engaged with or separated from the disk.

In this connection, the system comprises a water inlet and a chamber in fluid communication with the inlet and the outlet, inside which the disk is movable, the disk comprising at least one hole associated with the outlet and at least one hole associated with the inlet and being able to be displaced into the closed position, as a result of filling of the chamber, when the hole is closed by the shutter, or into the open position as a result of emptying of the chamber, when the hole is freed by the shutter.

The system is designed to be applied to a water supply network under a predefined pressure.

In the closed position, the water inside the chamber compresses the disk against the outlet. In the open position, the water entering via the inlet separates the disk from the outlet.

According to one aspect of the present invention, the chamber is in fluid communication with the cylindrical chamber. According to another aspect of the invention, the disk comprises a flexible membrane and a rigid washer; in particular, the holes associated with the inlet and outlet are in the rigid washer. Preferably, the membrane is configured to act as a seal between a body which delimits the inlet and the outlet and a body which comprises the chamber and the cylindrical chamber.

According to a preferred embodiment of the invention, the system further includes means for regulating the temperature of the water. In particular, in the system of this embodiment, opening or closing of the water and the adjustment of the flow are obtained by the displacement of the magnet associated with the pushbutton, operable, respectively, along an axis X, to open or close the water, or about the axis X, to adjust the flow, and wherein a temperature adjustment is made through a second knob, also rotatable about the axis X.

The adjustment knob of the temperature is united coupled in rotation to a disk shutter, having a central hole for the output of mixed water, associated with the outlet of the system, and one or more peripheral holes for the income of a greater or lesser amount of hot or cold water, associated with the inlets of hot and cold water of the system, according to an angular displacement of the disk shutter with respect to the inlets of hot and cold water.

In other words, the disk shutter is rotatable about the axis X to vary a ratio between the quantity of hot water and cold water input from the respective inlets of the system, according to an angular displacement of the disk shutter with respect to a fixed disk wherein the entries are delimited. The maximum water temperature is obtained by aligning the peripheral hole(s) to the inlet of hot water and consequently, blocking the passage of water from the inlet of cold water.

The minimum water temperature is obtained by aligning the peripheral hole(s) to the inlet of cold water and blocking the passage of water from the inlet of hot water.

The mixed water at different temperatures is obtained by placing the disk shutter in intermediate positions, in which both the cold and hot water enter the device, in equal or different quantities.

In one embodiment, the pushbutton is sliding over the knob, in partial or total coverage of the knob, during the manoeuvres of axial actuation, for the opening or closing of the water. A spring is provided to return the button in a starting position, following the opening or closing of the flow. In one embodiment, the knob is retracted and hidden in the button when the button is manually actuated along the axis.

Further features and advantages of embodiments of the present invention will be apparent from the description thereof, provided hereinbelow, with reference to the accompanying drawings and solely by way of a non-limiting example.

BRIEF DESCRIPTION OF THE DRAWINGS

FIG. 10 is an exploded view of a system according to an embodiment of the present invention, including means for regulating the temperature.

FIG. 11 is a sectional view of the system according to FIG. 10, with parts assembled and during full opening of the flow.

FIG. 12 is a cross-sectional view of the system according to FIG. 10, with assembled parts and during closure of the flow.

DETAILED DESCRIPTION

Figure 1:
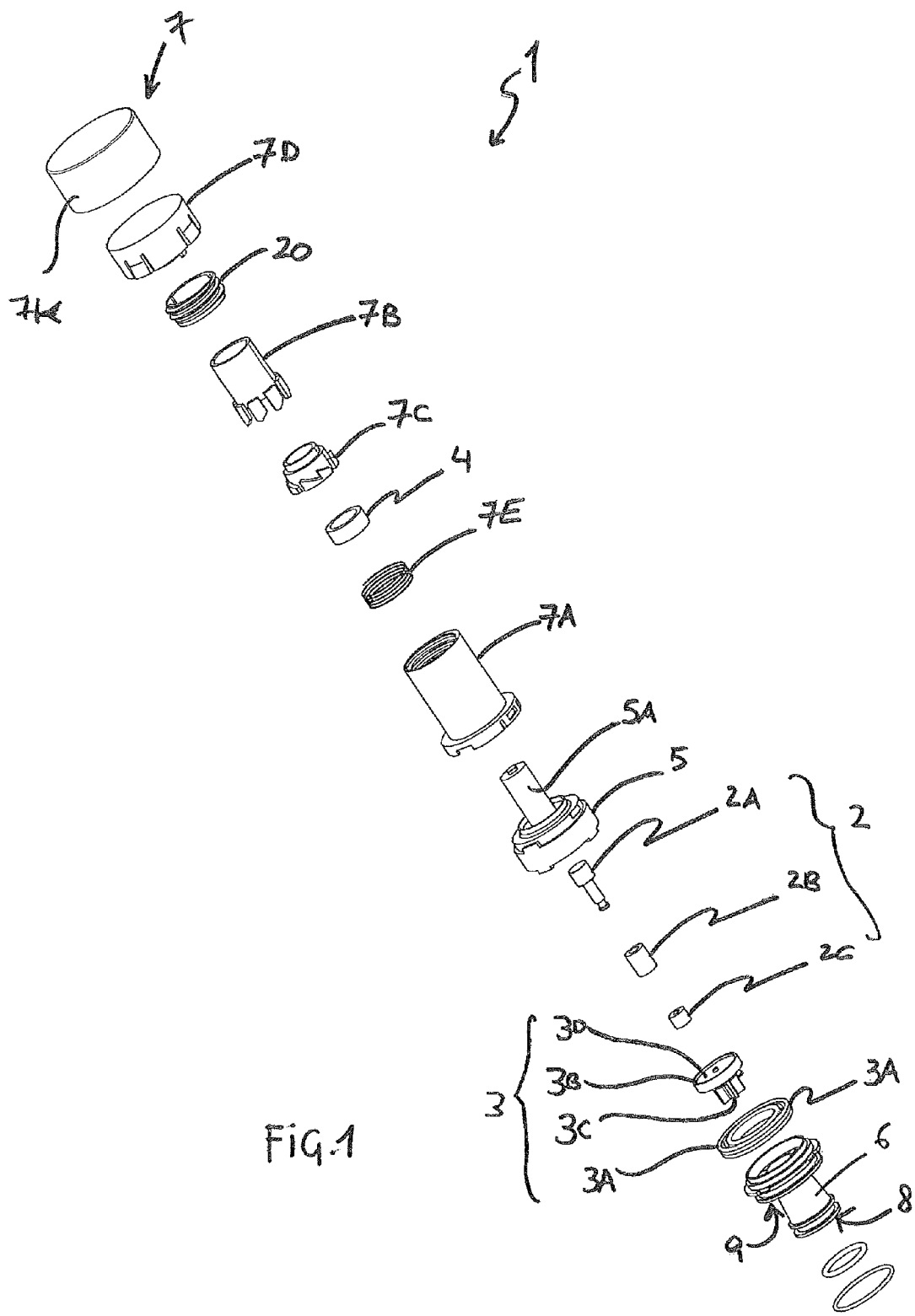
FIG. 1 is an exploded view of a system according to an embodiment of the present invention.

With reference to FIG. 1, a system 1 for adjusting water according to an embodiment of the present invention is schematically represented in exploded form, and in particular a system for opening and closing water in a shower or in a bathroom or kitchen sink and for adjusting the flowrate.

The system may be mounted on a shower panel or worktop of the kitchen or bathroom sink and has the function of opening and closing the water and adjusting the flowrate. The water is supplied via a diffuser in fluid communication with the system 1, for example a spray head mounted in a fixed or removable manner on the shower panel or a diffuser nozzle mounted on the sink.

Figure 2:
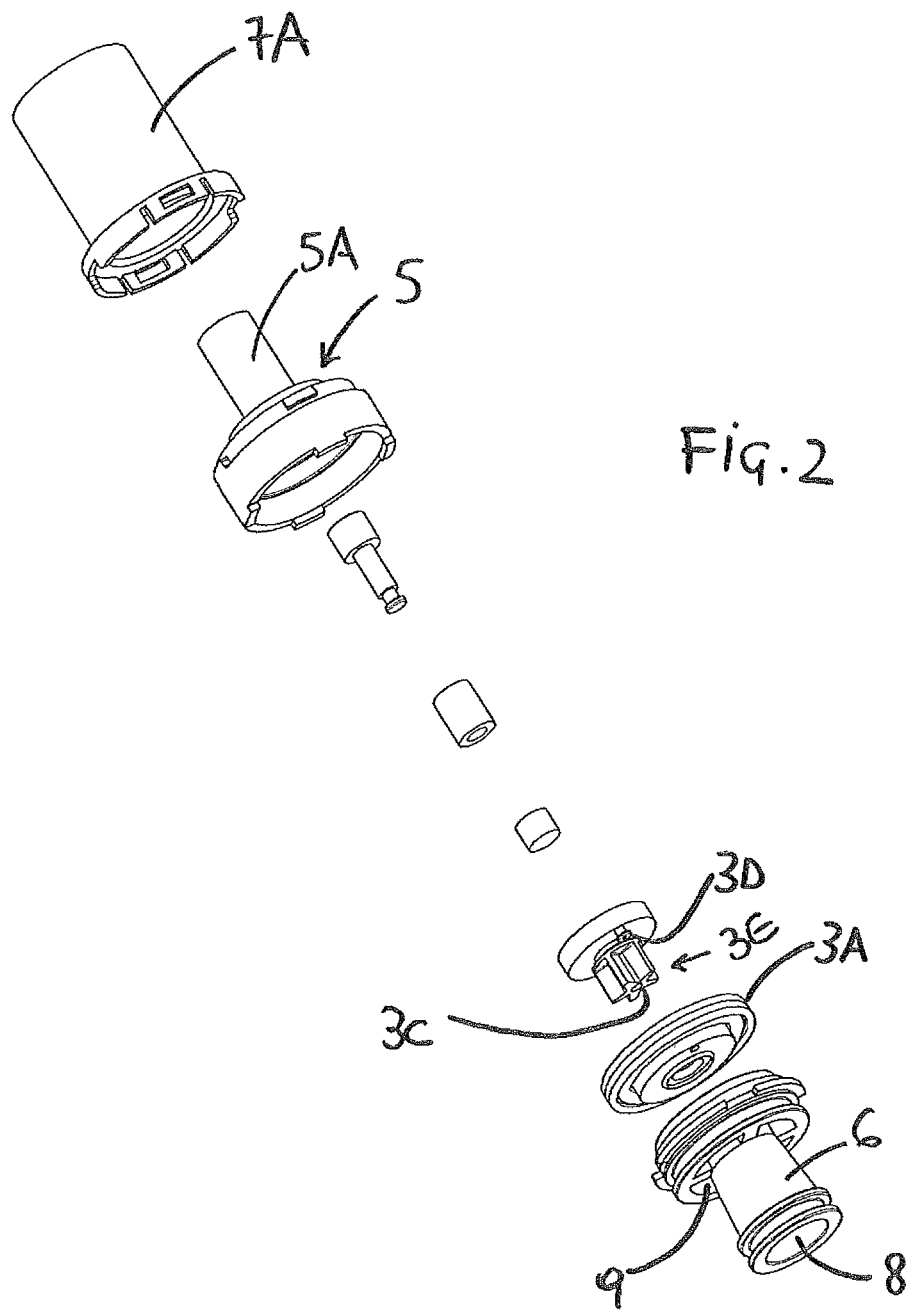
FIG. 2 is a view, on a larger scale, of a detail in FIG. 1.

FIGS. 1 and 2 represent a pushbutton 7, a body 5, a shutter 2, a disk 3 and a second body 6 of the system 1 according to an embodiment of the invention.

The pushbutton 7 comprises a cap 7D on which manual pressure may be applied by the operator; the cap 7D may be covered by a cover 7K so as to provide an aesthetic finish. The cap 7D, and its cover if present, has for example a surface area equivalent to that of a finger or slightly greater. The system 1 is preferably able to be mounted, in a concealed manner, with only the cap 7D (or its cover) visible and facing the user, preferably flush with the worktop or the shower panel. The pushbutton also comprises a pair of toothed wheels 7B, 7C and a spring 7E suitable for positioning a magnet 4 in two different stable positions associated with successive operating actions of the pushbutton 7D.

For this purpose, the body 5 comprises a cylindrical chamber 5a around which the magnet 4, the toothed wheel 7C, and along a predetermined section, the toothed wheel 7B are slidable. The spring 7E is arranged between the body 5 and the toothed wheel 7C containing the magnet 4.

A threaded hollow body 7A forms a seat for a portion of the body 5, allowing another portion of said body 5 projecting from the cylinder 7A to be coupled with the body 6. Preferably the body 6 and the body 5 form a bayonet closure or a snap-engaging closure. FIG. 2 represents the hollow cylinder 7a and the bodies 5 and 6 in exploded form.

Figure 4:
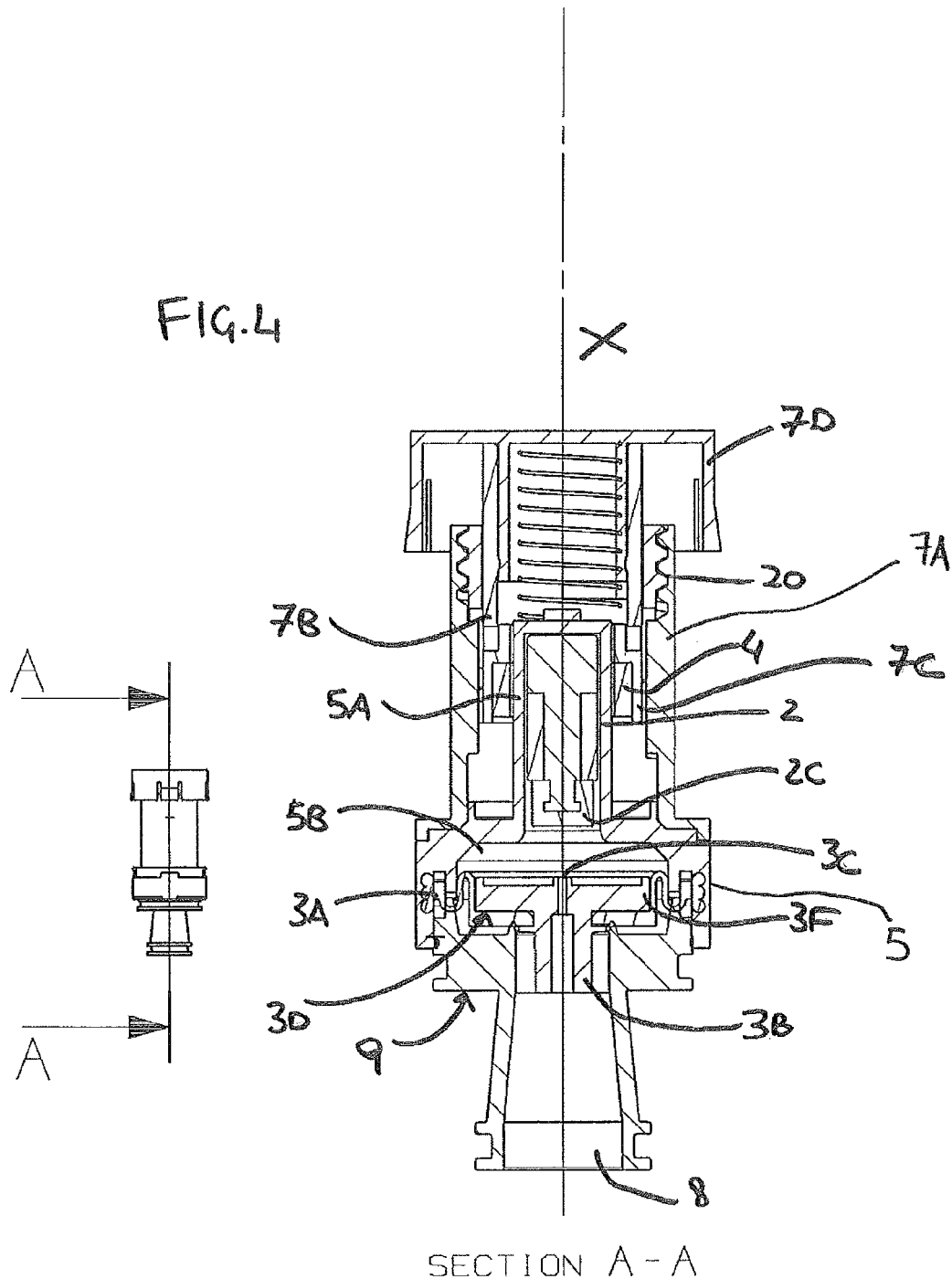
FIG. 4 is a cross-sectional view of the system according to FIG. 1, with parts assembled and during full opening of the flow.

As represented in FIG. 4, the magnet 4 is inserted inside the toothed wheel 7C and together with it onto the cylinder chamber 5a, inside the hollow cylinder 7A. The teeth of the wheel 7B and the teeth of the wheel 7C cooperate so that successive pressures on the cap 7D (or its cover 7K) displace the magnet 4 into a distal or proximal position of the cylindrical chamber 5a. Basically, the magnet has two stable (bistable) positions.

A shutter 2, having at least one metal part 2a, associated with the magnet 4, is situated inside the cylindrical chamber 5a (as visible also FIGS. 1 and 2). When the magnet 4 and the toothed wheel 7C are located in the distal position on the cylindrical chamber 5a (FIG. 6) the shutter 2 engages with the bottom part of the cylindrical chamber 5a, inside it, and has at least a distal part 2c projecting from the cylindrical chamber 5a. When instead the magnet 4 and the toothed wheel 7C are located in the proximal position on the cylindrical chamber 5a (FIG. 4) the shutter 2 engages with the top part of the cylindrical chamber 5a, still inside it, and is completely retracted inside the cylindrical chamber 5a.

The shutter comprises a seal 2c, which is mounted on the distal part 2c and designed to close a hole 3c in the disk 3, and a plastic spacer 2b. Preferably, the shutter 2 has a metal core 2A, on which the seal 2c is mounted in a distal position and the plastic spacer 2b, along a central section, leaving only the metal part 2a at the end of the shutter exposed to the force of attraction of the magnet 4.

Advantageously, the spacer allow the dimensions of the magnet, and therefore of the system 1, to be reduced; in fact, the magnet 4 may have a length substantially equal to the length of only a head 2aa (FIG. 6) of the metal part 2a, to guide precisely the shutter 2 inside the cylindrical chamber 5a.

The pushbutton 7 may be operated with a light pressure, for example with the pressure of a finger, to displace the magnet 4 and the associated shutter 2 and open the water flow from the diffuser or close the flow. In a preferred embodiment, the pushbutton 7 is configured to return into the same position, before and after closing or opening of the water flow.

For this purpose, as clear from the description which follows, the displacement of the shutter is of few millimeters and merely has the function of triggering a displacement of the fluid shut-off disk 3, which is intended to actually close and open the water flow through the diffuser.

In other words, it is merely required to lightly touch the pushbutton 7 with a finger in order to displace the shutter and the magnet into the disk triggering position, for opening or closing the flow.

Advantageously, it is sufficient to apply a very light pressure on the pushbutton 7 in order to bring the shutter into contact with the disk 3 or move the shutter away from the disk and to allow that the displacement of the disk, during opening or closing of the flow, respectively, is determined by the entry or exit of the water.

Full opening of flow corresponds to a maximum distance of the shutter of the disk 3 and full closure of the flow is obtained by bringing the shutter into contact with the disk 3.

In particular, the disk 3 comprises an elastically deformable membrane 3a and a rigid washer 3B on which the membrane is mounted. The disk is mounted between the body 5 and a second body 6 and acts as a seal between them. The bodies 5 and 6 are fixed together. The body 6 has an inlet 9 and an outlet 8 for the water. The inlet 9 is designed to receive pressurised water, for example water at a pressure of between 0.1 and 10 bar from the supply network.

Figure 6:
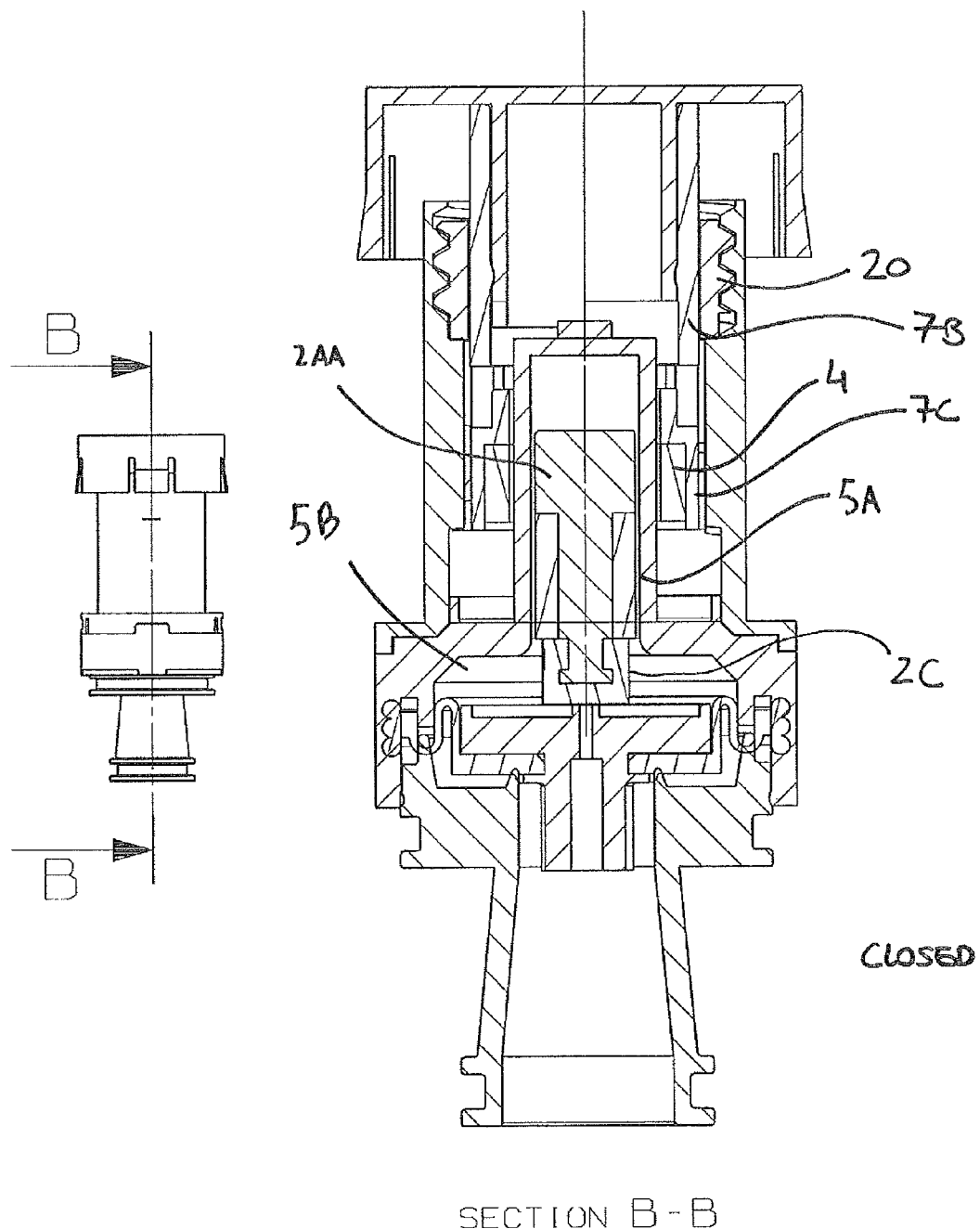
FIG. 6 is a cross-sectional view of the system according to FIG. 4, during full closure of the flow.
Figure 7:
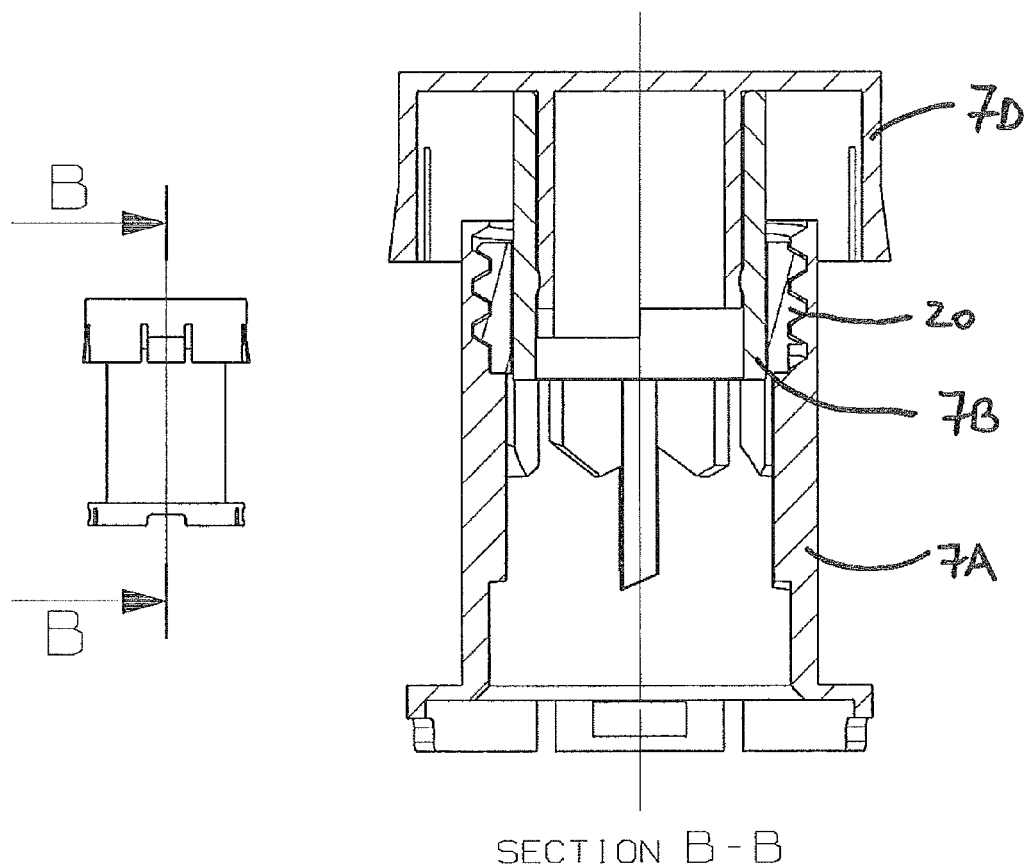
FIG. 7 is a cross-sectional view of a detail of the system according to FIG. 1.
Figure 8:
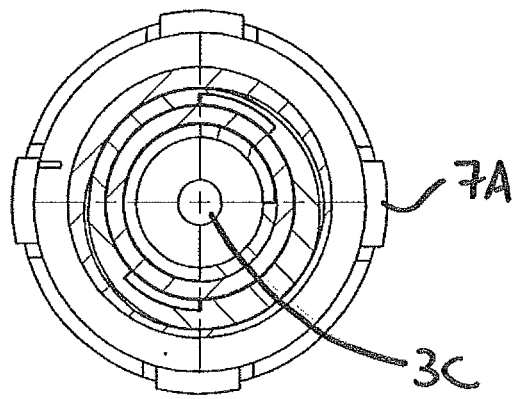
FIGS. 8 and 9 are views, from above and from the front, of the system according to FIG. 1, with assembled parts.
Figure 9:
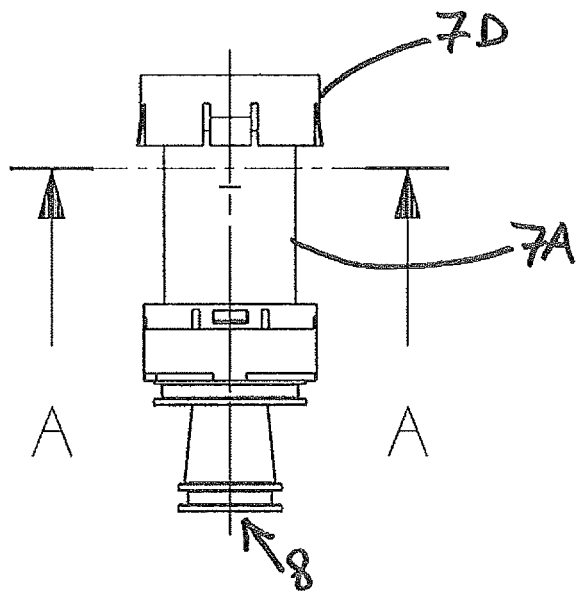

The disk 3 is provided with a hole 3d (FIG. 2) at the inlet 9 and the hole 3c at the outlet 8. The disk 3 is subject to the pressure of the incoming water 9 (from the bottom upwards in FIG. 1) which has the effect of displacing the disk downwards (FIG. 6). Via the hole 3d of the rigid washer 3b, the water may pass through the disk 3, filling the space between the disk and the body and compressing the disk 3 on the outlet 8, with partial deformation of the membrane 3a, in order to close the flow.

For this purpose, the seal 2c of the shutter closes off the central hole 3c of the rigid washer, thus allowing the pressure of the water (from the top downwards in FIG. 6) which pushes the membrane and the rigid washer against the outlet 8 to be greater than the pressure of the incoming water 9. During closure, the shutter projects from the cylindrical chamber and makes contact with the disk 3.

In other words, according to the system of an embodiment of the present invention, a chamber 5b is provided in the body 5, in fluid communication with the inlet 9 and the outlet 8, inside which chamber the disk 3 is movable. The disk 3 is configured to move so as to close the outlet 9 as a result of filling of the chamber 5b, when the hole 3c is closed off by the shutter 2, or to open the outlet 9, as a result of emptying of the chamber 5a, when the hole 3c is freed by the shutter 2.

FIG. 4 is a cross-sectional view of the system 1, in which the shutter 2 is retracted inside the cylindrical chamber 5a and spaced from the disk 3, leaving the hole 3c in the disk free. In this configuration, the water which enters into the chamber 5b through the hole 3d may pass out from the chamber 5b, through the hole 3c, and at the same time may exert a pressure on the disk 3 (from the bottom upwards, in FIG. 2) which raises the disk from the outlet 8, therefore allowing water to pass through the outlet 8.

When the shutter 2 is displaced against the disk 3, it has the function of closing the hole 3c, preventing the water from flowing out of the hole 3c and filling very rapidly the chamber 5c which exerts a pressure (from the top downwards) on the disk 3, compressing the disk against the outlet 8 and preventing the flow of water.

According to one aspect of the invention, the cylindrical chamber 5a has a diameter substantially equal to diameter of the shutter and is in fluid communication with the chamber 5a. The cylindrical chamber has a length of between 10 and 16 mm and a diameter of between 5 and 10 mm. The chamber 5a has a diameter of between 5 and 8 mm. The shutter in the cylindrical chamber is not subject to a high water pressure and, advantageously, may be easily displaced inside the chamber 5a. The user exerts on the shutter 2 only a pressure needed to cause projection of the shutter from the cylindrical chamber 5a and contact thereof with the disk 3, in order to close the water, or retraction thereof inside the cylindrical chamber 5b and separation from the disk 3, in order to open the flow.

The rigid washer 3b comprises preferably a shank in the form of a cross 3E or star 3E which can be inserted into the outlet 8; the width of the cross of the shank or the star is substantially the same as a diameter of the outlet 8. The washer also comprises a head 3F with a diameter greater than the outlet 8, acting as a plug; the hole 3D is situated on a peripheral part of the head 3F which does not involve the plug. The hole 3C has a diameter smaller than the diameter of the outlet 8; when the hole 3C is freed by the shutter, the water flows out of the outlet 8 without entering into the chamber 5a.

In FIGS. 4 and 6 the shutter is situated, respectively, in the position where the flow is fully open, for a maximum delivery of water, and the position where the flow is fully closed.

According to an embodiment of the invention it is envisaged regulating the water flow by means of the same pushbutton 7.

In particular, the pushbutton can be operated by means of a finger so as to displace the magnet 4 and the shutter 2 along an axis X of the cylindrical chamber 5a, into two different positions, corresponding to opening of the flow or closing of the flow of water from the diffuser, and is also rotatable about the axis X, in order to vary the open position of the shutter 2 along the axis X and therefore vary a corresponding flowrate.

Figure 5:
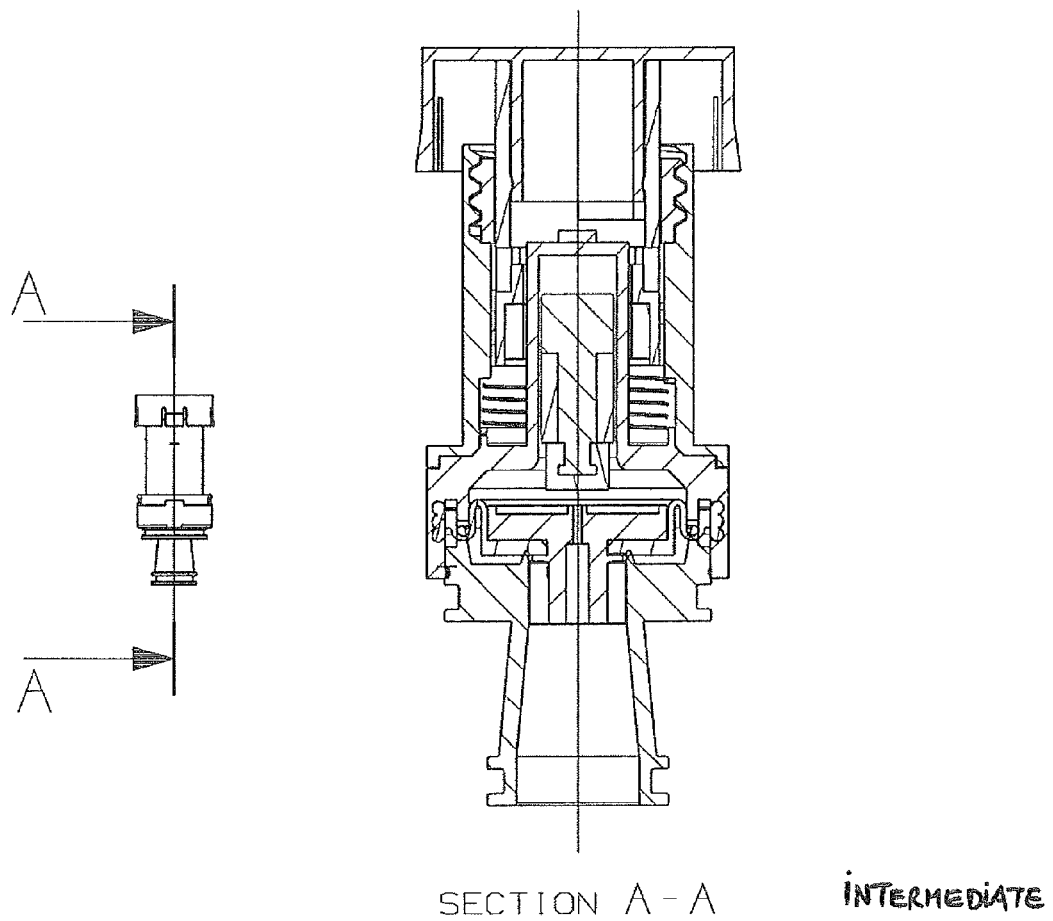
FIG. 5 is a cross-sectional view of the system according to FIG. 4, in an intermediate open position of the flow.

In this connection, FIG. 5 shows the piston in an intermediate position or only partially projecting from the cylindrical chamber 5a. In this position, the piston interferes partially with the fluid flow from the inlet 9 to the outlet 8, allowing therefore a reduction in the flow.

It is envisaged that the pushbutton 7, for example the cap 7D, is rotatable as a knob, in order to vary an end-of-travel position of the piston 7 in the cylindrical chamber 5a.

By screwing in the knob 7, the amount by which the shutter 2 is retracted inside the cylindrical chamber 5a is reduced, so as to obtain a corresponding reduction in flow. Vice versa, by unscrewing the knob 7, the amount by which the shutter 2 is retracted inside the cylindrical chamber 5a is increased, so as to obtain a corresponding increase in flow.

Figure 3:
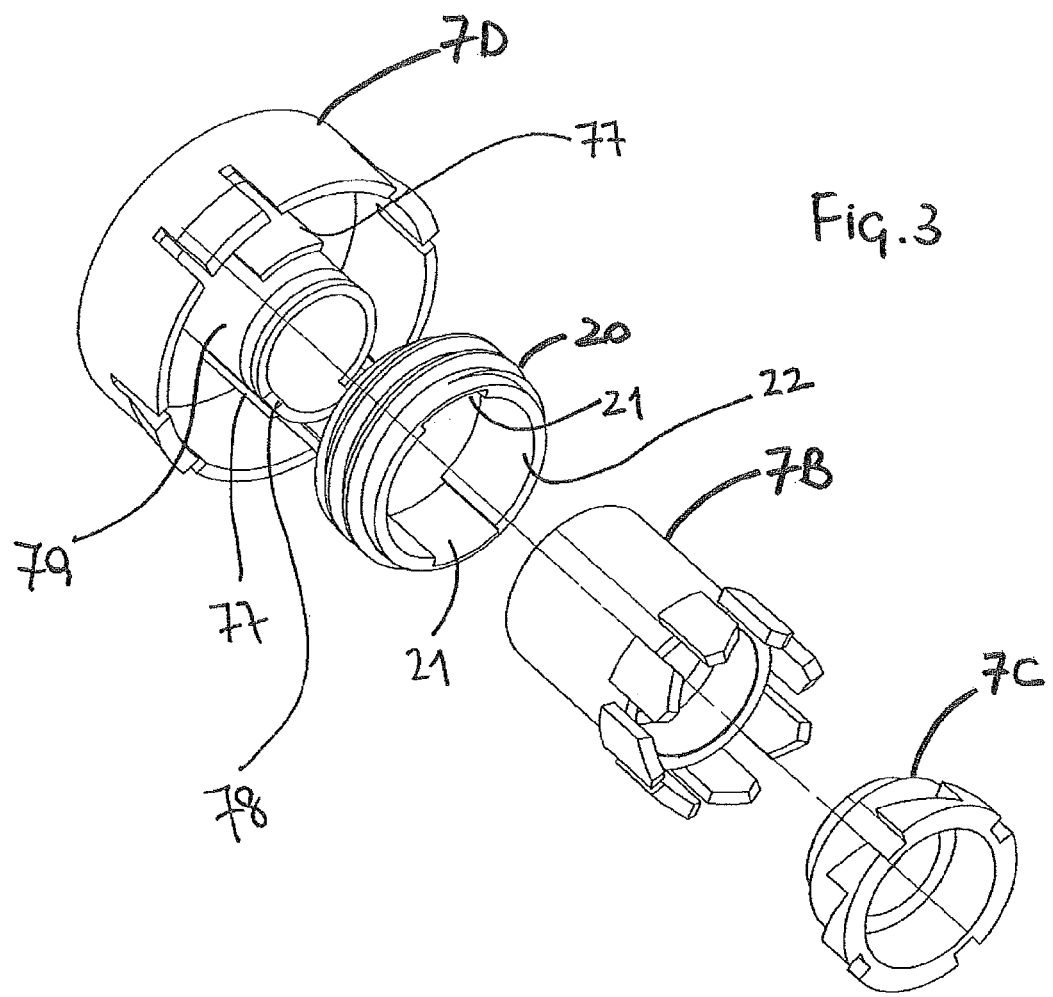
FIG. 3 is a view, on a larger scale, of another detail in FIG. 1.

For this purpose, an externally threaded cylinder 20 (FIG. 3) is engaged in a threaded portion of the hollow cylinder 7A and is rotatable by means of the pushbutton 7 (7D), so as to engage with a larger or smaller portion of the hollow cylinder 7A. The pushbutton 7 (7D) is provided with tongues 77 which engage inside respective recesses 21 formed in the thickness of the ring 20, on the inner surface 22 of the ring 20. Engagement of the tongues 77 inside the recesses 21 rotationally locks together the ring 20 and the pushbutton 7 (7D).

This engagement between the pushbutton 7 and the ring 20, and in particular the presence of the recesses 21, in any case allows an axial movement of the pushbutton 7 separate from the ring 20, for opening and closing the flow. In particular, a cylinder 79 of the pushbutton 7, passing through the threaded ring 20, is configured to exert a pressure on the toothed wheel 7C which regulates the position of the magnet.

The pushbutton 7 is fixed, preferably by means of snap-engagement, on the toothed wheel 7B.

Essentially, screwing of the ring 20 inside the threaded thickness of the hollow cylinder 7A displaces downwards the toothed wheel 7B and, together therewith, the toothed wheel 7C, the magnet 4 and consequently the piston 2.

Screwing of the knob 7 or unscrewing thereof from the hollow cylinder 7a may be performed during delivery of the flow, and therefore adjusting in real time the flowrate of the water, or when the water is closed, and therefore adjusting or resetting the flowrate prior to opening.

Means are envisaged for limiting rotation of the pushbutton 7 about the axis X, preferably limiting the rotation to 180°, for example by means of a locating shoulder 78 or a stop element 78 in the pushbutton 7D.

With reference to FIG. 10-12, is now described the system according to an embodiment of the present invention, further including also means for regulating the temperature. Features already described in the embodiment of FIG. 1-9 and having same function are not described here after.

With reference to FIG. 10, a system 1 for adjusting water according to an embodiment of the present invention is schematically represented in exploded form. The system may be mounted on a shower panel or worktop of the kitchen or bathroom sink and has the function of opening and closing the water and adjusting the flow rate and the temperature.

FIG. 10 represents a pushbutton 7, a second knob 10, a body 5, a shutter 2, a disk 3 and a second body 96. The pushbutton 7 is adapted to receive the manual pressure by the operator.

The system 1 is preferably able to be mounted, in a concealed manner, with the only pushbutton 7 and the second knob 10 visible and facing the user, preferably flush with the worktop or the shower panel.

The pushbutton 7 is associated to a pair of toothed wheels 7B, 7C and a spring 60, suitable to cooperate for positioning the magnet 4 in two different stable positions associated with successive operating actions of the pushbutton 7 along the axis X, as a consequence of a pressure on the pushbutton 7.

For this purpose, the body 5 comprises a cylindrical chamber 5a with a blind end 55a, around which the magnet 4, the toothed wheel 7C, and along a predetermined section, the toothed wheel 7B are slidable. The spring 60 is arranged between the body 5 and the toothed wheel 7C containing the magnet 4.

A threaded hollow body 11 forms a seat for a portion of the body 5, allowing another portion (the lower portion, in FIG. 10) of said body 5 projecting from the cylinder 11 to be coupled with the body 96. Means for coupling, for instance teeth 55b, 10b and recesses 66b, 11b, formed on peripheral parts of the body 5, of the second knob 10, of the body 96 and of the threaded hollow body 11, are provided to block in rotation said components of the system.

The magnet 4 is inserted inside the toothed wheel 7C and together with it onto the cylinder chamber 5a, inside the hollow cylinder 11. The teeth of the wheel 7B and the teeth of the wheel 7C cooperate so that successive pressures on the pushbutton 7 displace the magnet 4 into a distal or proximal position of the cylindrical chamber 5a, distancing a metal part 2a of a shutter 2, associated to the magnet 4, from a base 55a of the cylindrical chamber or approaching it to the base. Said displacement in a proximal or distal position is millimeter and thus requires only a light pressure on the pushbutton.

When the magnet 4 and the toothed wheel 7C are located in the distal position on the cylindrical chamber 5a (FIG. 12) the shutter 2 engages with the bottom part of the cylindrical chamber 5a, inside it, and has at least a distal part 2c projecting from the cylindrical chamber 5a. When instead the magnet 4 and the toothed wheel 7C are located in the proximal position on the cylindrical chamber 5a (FIG. 11) the shutter 2 engages with the top part of the cylindrical chamber 5a, i.e. towards the base 55a, still inside it, and is retracted inside the cylindrical chamber 5a.

The shutter 2 comprises a seal 2c, which is mounted on the distal part 2c and designed to close a hole 3c in the disk 3, and a plastic spacer 2b. Preferably, the shutter 2 has a metal core 2A, on which the seal 2c is mounted in a distal position and the plastic spacer 2b, along a central section, leaving only the metal part 2a at the end of the shutter exposed to the force of attraction of the magnet 4.

The pushbutton 7 is configured to return into the same position, before and after closing or opening of the water flow, i.e. after actuation along the axis X. The displacement of the shutter is of few millimeters and merely has the function of triggering a displacement of a fluid shut-off disk 3, which is intended to actually close and open the water flow through the system.

A light pressure on the pushbutton 7 brings the shutter 2 into contact with the disk 3 or moves the shutter 2 away from the disk 3 and allow, respectively, that the filling or emptying of the chamber 5 determines displacement of the disk 3, respectively, to closure or opening of the water flow.

Full opening of flow corresponds to a maximum distance of the shutter of the disk 3. Full closure of the flow is obtained by bringing the shutter into contact with the disk 3.

In particular, the disk 3 comprises an elastically deformable membrane 3a and a rigid washer 3B on which the membrane is mounted. The disk 3 is mounted between the body 5 and a second body 96 and acts as a seal between them. The bodies 5 and 96 are fixed together and delimit the chamber 5 within which the disk 3 moves.

The body 96 is associated with the inlets 9 and 9b of hot and cold water of the system and with an output 8. The inlets 9, 9b are adapted to receive water under pressure, for example at a pressure between 0.1 and 10 bar coming from the distribution network. The disk 3 is provided with a hole 3d in fluid communication with the inlets 9, 9b and a hole 3c in fluid communication with the outlet 8. The disk 3 is subject to the pressure of the incoming water (from the top to the bottom in FIG. 12) which has the effect of displacing the disk downwards. In fact, via the hole 3d of the rigid washer 3b, the water may pass, filling the space between the disk 3 and the body 5 and pushing the disk 3 on the outlet 8, with partial deformation of the membrane 3a, in order to close the flow.

For this purpose, the seal 2c of the shutter closes off the central hole 3c of the rigid washer, thus allowing the pressure of the water (from the top downwards in FIG. 12) which pushes the membrane and the rigid washer against the outlet 8 to be greater than the pressure of the incoming water 9. During closure, the shutter 2 projects from the cylindrical chamber 5a and makes contact with the disk 3.

In other words, according to the system of an embodiment of the present invention a chamber 5b is provided in the body 5, in fluid communication with the inlets and the outlet 8, inside which chamber the disk 3 is movable. The disk 3 is configured to move to intercept the water flow to the outlet 8 as a result of filling of the chamber 5b, when the hole 3c is closed off by the shutter 2, or to open the outlet 9, as a result of emptying of the chamber 5a, when the hole 3c is freed by the shutter 2.

FIG. 11 is a cross-sectional view of the system 1, in which the shutter 2 is refracted inside the cylindrical chamber 5a and spaced from the disk 3, leaving the hole 3c in the disk 3 free. In this configuration, the water which enters into the chamber 5b through the hole 3d may pass out from the chamber 5b, through the hole 3c, and at the same time may exert a pressure on the disk 3 (from the bottom upwards, in FIG. 11) which raises the disk from the outlet 8, therefore allowing water to pass through the outlet 8.

When the shutter 2 is displaced against the disk 3, it has the function of closing the hole 3c, preventing the water from flowing out of the hole 3c and causing a fast filling of the chamber 5b, thus increasing the pressure of the water (from the top downwards) on the disk 3, pushing it against the outlet 8.

Water flow is adjusted by means of the same pushbutton 7. In particular, the pushbutton 7 is rotatable about the axis X, in order to vary the open position of the shutter 2 along the axis X and to vary a corresponding flow rate. Substantially, the opening position of the shutter 2, which corresponds to a more retracted position A of the shutter towards the bottom 55a of the chamber 5a with respect to a closing position B, can be adjusted by rotation of the button 7, bringing the shutter in a position A1 of opening more advanced or more retracted of the position A and, respectively, more or less interfering in the fluid path from the inlets 9 to the outlet 8.

Screwing the pushbutton 7 in the hollow cylinder 11, the amount by which the shutter 2 is refracted inside the cylindrical chamber 5a is reduced, for effect of the magnet, and thus the water flow is reduced. Vice versa, by unscrewing the pushbutton 7, the amount by which the shutter 2 is retracted inside the cylindrical chamber 5a is increased, so as to obtain a corresponding increase in flow.

For this purpose, an externally threaded ring 20 is engaged in a threaded portion of the hollow cylinder 11 and is rotatable by means of the pushbutton 7, so as to engage with a larger or smaller portion of the hollow cylinder 11. The button 7 is coupled to the ring 20 via a body 12 having a base 122, a cylinder 123 on the base, and at least one tab 77 on the outside of the cylinder 123, adapted to slide in a respective groove 222 located on the inner surface of the ring 20, for solidarity in rotation the ring 20, the body 12 and the button 7. Between the cylinder 123 and the tab 77 is inserted a cylindrical portion 7BC of the toothed wheel 7B which is in contact with the base.

This engagement between the pushbutton 7 and the ring 20, and in particular the presence of the recesses 222, allows an axial movement of the pushbutton 7 separate from the ring 20, for opening and closing the flow. In particular, the tab 77 passing through the threaded ring 20 is configured to exert a pressure on the toothed wheel 7C which regulates the position of the magnet 4.

Essentially, screwing of the ring 20 inside the threaded thickness of the hollow cylinder 11 displaces downwards the toothed wheel 7B and, together therewith, the toothed wheel 7C, the magnet 4 and consequently the shutter 2.

Screwing the knob 7 or unscrewing thereof from the hollow cylinder 11 may be performed during delivery of the flow, and therefore adjusting the flow rate of the water during supply, or when the water is closed, and therefore adjusting or resetting the flow rate before the supply.

The second knob 10 for adjusting the temperature is integrally coupled in rotation to the hollow cylinder 11, the bodies 5 and 66, and a disc shutter 400, having a central outlet hole 401 and one or more peripheral holes 402. Rotation of the second knob 10 about the axis X is independent from the rotation of the pushbutton 7.

The disc shutter 400 is rotatable around the axis X to vary a ratio between the quantity of hot water and cold water input from the respective inlets 9, 9b, according to an angular displacement with respect to a fixed disk 900, delimiting the inlets 9, 9b.

The disc shutter 400 is made of ceramic material and the fixed disk 900 is made of plastic material. Among the shutter disk 400 and the hard disk 900 is interposed a ceramic disc 500, having substantially the same configuration of inlets and outlets of the hard disk 900.

The maximum water temperature is obtained by aligning the peripheral hole(s) to the inlet of hot water. The minimum temperature is obtained by aligning the peripheral hole (s) to the inlet of cold water. Intermediate temperatures are obtained by placing the disc shutter to receive water in part from the inlet of hot water and in from the inlet of cold water, in equal or different extent.

The invention claimed is:

1. A system for adjusting water in a shower, bathroom, or kitchen sink, the system comprising
    a shutter having at least one metal part, slidable inside a cylindrical chamber with a diameter that is substantially equal to the diameter of the shutter; and
    a pushbutton comprising a magnet associated with the at least one metal part;
    wherein the pushbutton is adapted to be operated manually to displace the magnet and the shutter along an axis of the cylindrical chamber, into two different positions, corresponding to an opening of the flow or to a closure of the flow of water from a diffuser;
    where said pushbutton also is rotatable about said axis, to vary said open position of the shutter along the axis and vary a corresponding flowrate
    a second knob rotatable about the axis to vary a temperature of the water;
    an outlet for delivery of the water and a disk movable along the axis between a position for closing the outlet and a position for opening the outlet, said closing or opening position of the disk being manually obtained moving the pushbutton along the axis to displace the shutter in said positions for closing or opening;
    at least an inlet for hot water and at least an inlet for cold water; and
    a chamber in fluid communication with the inlets and with the outlet, inside which the disk is movable, said disk comprising at least one hole associated with the outlet and at least one hole in fluid communication with the inlets, and being configured to be displaced into the closed position for a filling of the chamber, if the hole associated to the outlet is closed off by the shutter, or into the open position, for an emptying of the chamber, if the hole associated to the outlet is freed by the shutter.

2. The system according to claim 1, wherein, in the position for opening, the shutter is retracted more towards a base of the cylindrical chamber with respect to the position for closing.

3. The system according to claim 2, wherein said pushbutton is rotatable to adjust the amount by which said shutter is retracted towards the base of the cylindrical chamber in said position for opening the flow, and wherein a lesser retraction of the shutter towards the base of the cylindrical chamber corresponds to a lesser flow rate with respect to a flow rate corresponding to a greater refraction of the shutter towards the base of the cylindrical chamber.

4. The system according to claim 1, further comprising:
    a threaded ring; and
    means for coupling the threaded ring with the pushbutton, said means for coupling the threaded ring being adapted to rotationally lock about said axis said pushbutton and said threaded ring, for the flow regulation operations, and being slidable inside the threaded ring by means of operation of said pushbutton along the axis, for the opening and closing operations.

5. The system according to claim 4, wherein said threaded ring is engaged inside a threaded hollow cylinder, said position for opening the shutter being varied, respectively, to increase or decrease the flow, by means of a greater or lesser screwing of the threaded ring inside the hollow cylinder, via said pushbutton.

6. The system according to claim 1, wherein the pushbutton is configured to return into a same position, before and after operation for opening or closing along the axis.

7. The system according to claim 1, wherein the shutter is slidable inside the cylindrical chamber around that the magnet is also slidable, and wherein the shutter has a length substantially corresponding to a length of the cylindrical chamber.

8. The system according to claim 1, further comprising:
    an outlet for delivery of the water; and
    a disk movable along the axis between a position for closing the outlet and a position for opening the outlet, said closing or opening position of the disk being manually obtained moving the pushbutton along the axis to displace the shutter in said positions for closing or opening.

9. The system according to claim 1, wherein, in the closed position, the water inside the chamber is adapted to compress the disk against the outlet.

10. The system according to claim 1, wherein, in the open position, the water entering via the inlets is adapted to raise the disk from the outlet.

11. The system according to claim 1, further comprising:
    a threaded ring; and
    means for coupling the threaded ring with the pushbutton, said means for coupling the threaded ring being adapted to rotationally lock about said axis said pushbutton and said threaded ring, for the flow regulation operations, and being slidable inside the ring by means of operation of said pushbutton along the axis, for the opening and closing operations;
    wherein said threaded ring is engaged inside a threaded hollow cylinder, said position for opening the shutter being varied, respectively, to increase or decrease the flow, by means of a greater or lesser screwing of the threaded ring inside the hollow cylinder, by means of said pushbutton; and
    wherein said second knob for adjusting the temperature is integrally coupled in rotation to said hollow cylinder and to a disk shutter, having an outlet hole and a peripheral hole, said disk shutter being rotatable about the axis to vary a ratio between the quantity of hot water and cold water input from the respective inlets according to an angular displacement with respect to a fixed disk delimiting said inlets.

12. The system according to claim 1, wherein said chamber is in fluid communication with said cylindrical chamber.

13. The system according to claim 1, wherein said disk includes a flexible membrane and a rigid washer said holes associated with the inlet and outlet being defined in the rigid washer.

14. The system according to claim 13, wherein said membrane is configured to act as a seal between a body associated to the inlet and to the outlet and a body associated to the chamber and to the cylindrical chamber.

* * * * *